(12) United States Patent
Kasuga

(10) Patent No.: US 9,979,940 B2
(45) Date of Patent: May 22, 2018

(54) PROJECTOR AND METHOD FOR CONTROLLING PROJECTOR

(71) Applicant: SEIKO EPSON CORPORATION, Tokyo (JP)

(72) Inventor: Hirofumi Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/478,308

(22) Filed: Apr. 4, 2017

(65) Prior Publication Data

US 2017/0302898 A1    Oct. 19, 2017

(30) Foreign Application Priority Data

Apr. 15, 2016    (JP) .................. 2016-081819

(51) Int. Cl.
*G03B 21/14*    (2006.01)
*H04N 9/31*    (2006.01)
*G03B 21/00*    (2006.01)

(52) U.S. Cl.
CPC ......... *H04N 9/3194* (2013.01); *G03B 21/006* (2013.01); *G03B 21/142* (2013.01); *G03B 21/147* (2013.01); *H04N 9/3102* (2013.01); *H04N 9/3185* (2013.01); *G03B 2205/0007* (2013.01)

(58) Field of Classification Search
CPC ...... H05N 5/74; H05N 5/7416; H05N 5/7441; H04N 9/31; H04N 9/3102; H04N 9/3108; H04N 9/317; H04N 9/3173; H04N 9/3185; G03B 21/003; G03B 21/005; G03B 21/006; G03B 21/14
See application file for complete search history.

(56) References Cited

U.S. PATENT DOCUMENTS

| 7,213,926 B2* | 5/2007 | May .................. H04N 5/74 348/E5.137 |
| 7,692,604 B2* | 4/2010 | Yokote ................ H04N 5/7416 345/5 |
| 2006/0187421 A1* | 8/2006 | Hattori .................. H04N 5/74 353/69 |
| 2014/0066127 A1 | 3/2014 | Naiki et al. |
| 2017/0299883 A1* | 10/2017 | Nonaka ............... G02B 27/646 |

FOREIGN PATENT DOCUMENTS

| JP | 2012-047850 A | 3/2012 |
| JP | 2013-225040 A | 10/2013 |

* cited by examiner

*Primary Examiner* — William C Dowling
(74) *Attorney, Agent, or Firm* — Oliff PLC

(57) ABSTRACT

A projector that projects image light on a projection surface includes a light modulator that modulates light emitted from a light source based on image information to form the image light, a projection system that projects the image light modulated by the light modulator on the projection surface, a light modulator moving section that changes the position of the light modulator, a vibration detecting section that detects vibration acting on the projector, and a controller that causes the light modulator moving section to change the position of the light modulator based on the vibration detected by the vibration detecting section.

8 Claims, 9 Drawing Sheets

PROJECTOR AND METHOD FOR CONTROLLING PROJECTOR

The entire disclosure of Japanese Patent Application No. 2016-081819, filed Apr. 15, 2016 is expressly incorporated by reference herein.

BACKGROUND

1. Technical Field

The present invention relates to a projector and a method for controlling the projector.

2. Related Art

In recent years, there is a known projector that projects an enlarged image on a wall or any other surface to display the image.

In a case where such a projector is installed at a location having insufficient strength, the projector receives vibration, for example, from the installation surface, resulting in a blur (shake) of an image projected by the projector. A viewer who views the image projected by the projector then perceives a decrease in resolution of the projected image in some cases.

To avoid the situation described above, there is a known technology of related art for moving a projection lens in accordance with the vibration acting on the projector to suppress vibration of the projected image (JP-A-2012-47850, for example).

The technology described in JP-A-2012-47850 is suitable for a projector including a lens having a small volume and a light weight, for example, a portable projector. It is, however, difficult in some cases to adapt the technology described in JP-A-2012-47850 to a projector including a lens having a large volume and a heavy weight, such as a high-luminous-flux projector.

In the case of a projector including a lens having a large volume and a heavy weight, the projector is required to be provided with a motor capable of moving the lens. The motor is in some cases a motor having a large volume. The technology described in JP-A-2012-47850 therefore has a difficulty reducing the size of the projector main body in some cases.

The technology described in JP-A-2012-47850 therefore has in some cases a difficulty reducing an image blue produced by vibration acting on a projector including a lens having a large volume and a heavy weight, such as a high-luminous-flux projector.

SUMMARY

An advantage of some aspects of the invention is to provide a projector and a method for controlling the projector that correct a blur of a projected image in accordance with vibration acting on the projector.

An aspect of the invention is directed to a projector that projects image light on a projection surface, the projector including a light modulator that modulates light emitted from a light source based on image information to form the image light, a projection system that projects the image light modulated by the light modulator on the projection surface, a light modulator moving section that changes a position of the light modulator, a vibration detecting section that detects vibration acting on the projector, and a controller that causes the light modulator moving section to change the position of the light modulator based on the vibration detected by the vibration detecting section.

With this configuration, the projector changes the position of the light modulator on the basis of the vibration acting on the projector. The projector can therefore correct a blur of a projected image in accordance with the vibration acting on the projector.

As another aspect of the invention, the projector may be configured such that the projector further includes an image processing section that adjusts the image information to be outputted to the light modulator, and in a case where the vibration detected by the vibration detecting section is smaller than a threshold, the controller causes the image processing section to adjust the image information, whereas in a case where the vibration is greater than or equal to the threshold, the controller causes the light modulator moving section to change the position of the light modulator.

With this configuration, in the case where the magnitude of the vibration acting on the projector is smaller than the threshold, the image information to be projected is adjusted, whereas in the case where the magnitude of the vibration acting on the projector is greater than or equal to the threshold, the position of the light modulator is corrected. The projector can therefore use a correction method suitable for the magnitude of the vibration acting on the projector.

As another aspect of the invention, the projector may be configured such that, in the case where the vibration detected by the vibration detecting section is greater than or equal to the threshold, the controller causes the image processing section to adjust the image information and further causes the light modulator moving section to change the position of the light modulator.

With this configuration, in the case where the magnitude of the vibration acting on the projector is greater than or equal to the threshold, an image is adjusted and the position of the light modulator is changed. The projector can therefore correct a blur of a projected image even in a case where large vibration acts on the projector.

Another aspect of the invention is directed to a method for controlling a projector including alight modulator that modulates light emitted from a light source based on image information to form image light and a projection system that projects the image light modulated by the light modulator on a projection surface, the method including a vibration detection step of detecting vibration acting on the projector and a control step of changing a position of the light modulator based on the vibration detected in the vibration detection step.

With this configuration, the method for controlling a projector changes the position of the light modulator on the basis of the vibration acting on the projector. The method for controlling a projector can therefore correct a blur of a projected image in accordance with the vibration acting on the projector.

As described above, the projector changes the position of the light modulator on the basis of the vibration acting on the projector. The projector and the method for controlling the projector can therefore correct a blue of an image projected by the projector in accordance with the vibration acting on the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail with reference to the drawings.

First Embodiment: Configuration of Projector in which Liquid Crystal Panels are Moved The configuration of a projector 1 according to a first embodiment will be described below with reference to FIG. 1.

Figure 1:
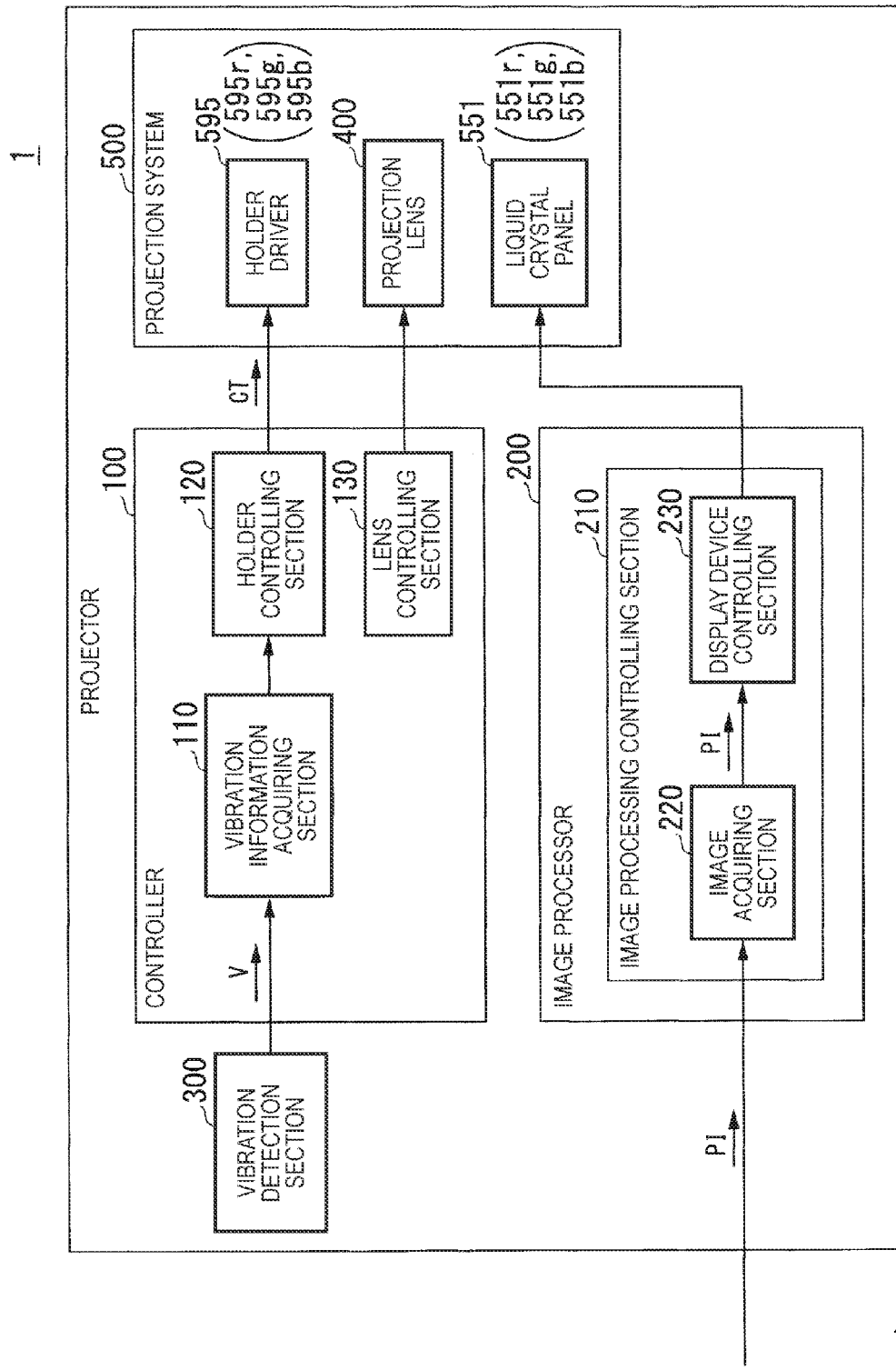
FIG. 1 shows an example of the configuration of a projector according to a first embodiment.

FIG. 1 shows an example of the configuration of the projector 1 according to the first embodiment.

The projector 1 includes a vibration detecting section 300, a controller 100, an image processor 200, and a projection system 500, as shown in FIG. 1. The projector 1 is, for example, a high-luminous-flux projector that projects and displays an enlarged image on a projection surface, such as a screen and a wall surface.

Vibration Detecting Section

The vibration detecting section 300 is a detector that detects vibration acting on the projector 1. The vibration detection section 300 is, for example, a vibration sensor and at least detects vibration in the direction parallel to the projection surface. In the vibration sensor, a piezoelectric device converts the vibration acting on the projector 1, which is a target to be sensed, into voltage. The vibration detecting section 300 outputs vibration information V, which is a result of the detection of vibration, to the controller 100.

The vibration information V contains displacement information DP and direction information DR. The displacement information DP is information representing the distance over which the projector 1 moves due to the vibration acting on the projector 1. The direction information DR is information representing the direction of the vibration acting on the projector 1.

The vibration detecting section 300 detects vibration acting on the projector 1 on a continuous or regular basis.

Image Processor

The image processor 200 includes an image processing control section 210. The image processing control section 210 includes a CPU (central processing unit) and includes, as functional sections of the CPU, an image acquiring section 220 and a display device controlling section 230.

The image acquiring section 220 externally receives, via an input port, image information PI representing an image. The input port complies, for example, with DVI, HDMI (registered trademark), or SDI. The image acquiring section 220 acquires the image information PI via the input port and outputs the acquired image information PI to the display device controlling section 230.

The display device controlling section 230 controls drive operation performed on liquid crystal panels 551r, 551g, and 551b, which are provided in the projection system 500, on the basis of the image information PI acquired from the image acquiring section 220. Specifically, the display device controlling section 230 performs image formation control in which images represented by the image information PI supplied from the image acquiring section 220 are formed in image formable regions of the liquid crystal panels 551r, 551g, and 551b on the basis of the image information PI. The liquid crystal panel 551r modulates red light, the liquid crystal panel 551g modulates green light, and the liquid crystal panel 551b modulates blue light. In the following description, in a case where the liquid crystal panels 551r, 551g, and 551b are not distinguished from one another, they are collectively referred to as a liquid crystal panel 551. The liquid crystal panel 551 is an example of a light modulator.

Controller

The controller 100 includes a CPU and includes, as functional sections of the CPU, a vibration information acquiring section 110, a holder controlling section 120, and a lens controlling section 130.

The vibration information acquiring section 110 acquires the vibration information V from the vibration detection section 300. The vibration information acquiring section 110 outputs the acquired vibration information V to the holder controlling section 120.

The lens controlling section 130 performs focus drive control, lens shift drive control, zoom drive control, and other types of control on a projection lens 400 provided in the projection system 500. Further, the lens controlling section 130 manages lens information, such as a lens shift range, a zoom range, the current lens shift position, the current zoom position, and the coordinates of the center corresponding to the optical axis.

The holder controlling section 120 acquires the vibration information V from the vibration information acquiring section 110. The holder controlling section 120 controls drive operation performed on holder drivers 595r, 595g, and 595b, which are provided in the projection system 500, in accordance with the acquired vibration information V. The holder driver 595r is driven under the control of the holder controlling section 120 to move the liquid crystal panel 551r. The holder driver 595g is driven under the control of the holder controlling section 120 to move the liquid crystal panel 551g. The holder driver 595b is driven under the control of the holder controlling section 120 to move the liquid crystal panel 551b. In the following description, in a case where the holder drivers 595r, 595g, and 595b are not distinguished from one another, they are collectively referred to as a holder driver 595.

The holder controlling section 120 calculates the position to which the liquid crystal panel 551 is moved in accordance with the vibration information V. The position to which the liquid crystal panel 551 is moved in accordance with the vibration information V is a position where the vibration represented by the vibration information V is canceled. Specifically, the position to which the liquid crystal panel 551 is moved in accordance with the vibration information V is a position shifted from the current position of the liquid crystal panel 551 by the distance represented by the displacement information DP contained in the vibration information V in the direction opposite the direction of the vibration represented by the direction information DR contained in the vibration information V.

The holder controlling section 120 controls the drive operation performed on the holder driver 595 in accordance with the acquired vibration information V in such a way that the liquid crystal panel 551 is moved to the position where the vibration acting on the projector 1 is canceled. The holder controlling section 120 produces a control signal CT that controls the holder driver 595 on the basis of the acquired vibration information V. The control signal CT is a signal that controls drive operation performed on the holder driver 595 in such a way that the liquid crystal panel 551 is moved to the position where the vibration acting on the projector 1 is canceled. The holder controlling section 120 outputs the produced control signal CT to the projection system 500.

Projection System

The projection system 500 includes a plurality of functional sections for image projection. Among the sections provided in the projection system 500, the holder driver 595 and the projection lens 400 are controlled by the controller 100. Among the sections provided in the projection system 500, the liquid crystal panel 551 is controlled by the image processor 200.

The holder driver 595 is driven on the basis of the control signal CT inputted from the controller 100. Specifically, the holder driver 595 is so driven on the basis of the inputted control signal CT as to move the liquid crystal panel 551 in the direction that allows the vibration acting on the projector 1 to be canceled.

The projection lens 400 is controlled in terms of focus drive, lens shift drive, and zoom drive under the control of the lens control section 130.

In the liquid crystal panel 551, an image is formed in the image formable region thereof under the control of the image processor 200.

The projection system 500 provided in the projector 1 will be described below in detail.

Detailed Configuration of Projection System

The projection system 500 will be described below in detail with reference to the drawings.

Figure 2:
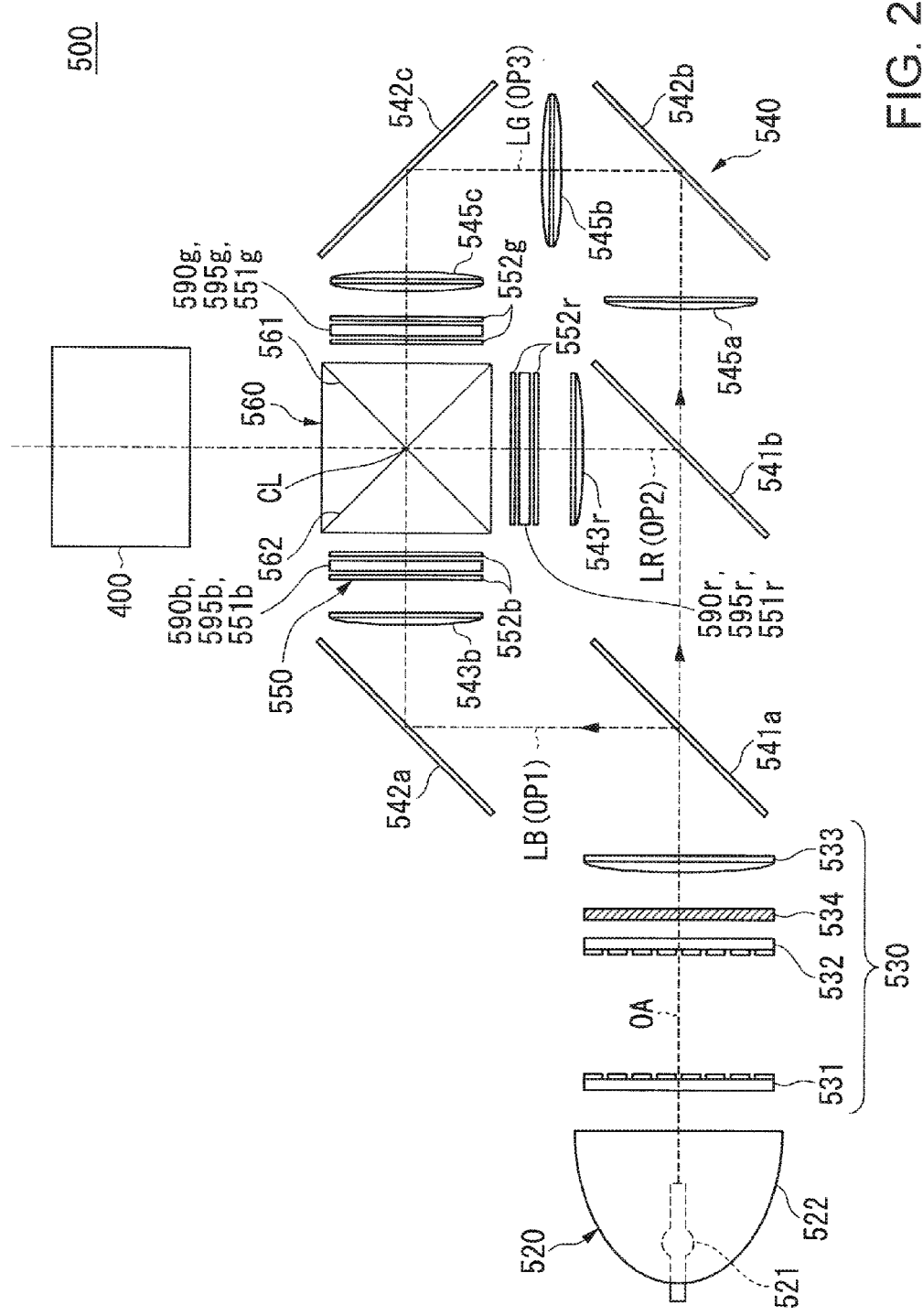
FIG. 2 shows an example of a projection system in the first embodiment.

FIG. 2 shows an example of the projection system 500 in the first embodiment.

The projection system 500 includes a light source apparatus 520, which produces light source light, a homogenizing system 530, which homogenizes illumination light from the light source apparatus 520, a color separation system 540, which separates the illumination light having passed through the homogenizing system 530 into red, green, and blue three-color light fluxes, a light modulating section 550, which is illuminated with the color illumination light fluxes having exited out of the color separation system 540, a cross dichroic prism 560, which combines the modulated color light fluxes from the light modulating section 550, and the projection lens 400, which projects image light having traveled through the cross dichroic prism 560 on the projection surface (not shown). Among the components described above, the light source apparatus 520 and the homogenizing system 530 function as an illuminator that outputs the illumination light.

The light source apparatus 520 includes a lamp body 521, which forms a roughly point-shaped light emitter, and a parabolic concave mirror 522, which collimates the light source light emitted from the lamp body 521. Out of the two components described above, the lamp body 521 is formed, for example, of a lamp light source, such as a high-pressure mercury lamp, and produces roughly white light source light. The concave mirror 522 reflects the light rays radiated from the lamp body 521 and causes them to be incident in the form of a parallelized light flux on the homogenizing system 530. The parabolic concave mirror 522 may be replaced with a non-parabolic concave mirror, such as a concave mirror having a spherical surface or an elliptical surface. In the case where a non-parabolic concave mirror is used, a parallelizing lens disposed between the concave mirror 522 and the homogenizing system 530 allows a parallelized light flux to be outputted from the light source apparatus 520.

The homogenizing system 530 includes a pair of fly-eye systems 531 and 532, a superimposing lens 533, which superimposes wavefront-division light fluxes on one another, and a polarization conversion member 534, which converts the illumination light into a predetermined polarized component. The pair of fly-eye systems 531 and 532 are each formed of a plurality of element lenses arranged in a matrix, and the element lenses divide the illumination light from the light source apparatus 520 into a plurality of individual divergent or convergent light fluxes. The polarization conversion member 534 converts the illumination light fluxes having exited out of the fly-eye systems 531 and 532 into one type of polarized light fluxes (formed, for example, only of S-polarized component polarized perpendicularly to the plane of view of FIG. 2) and outputs the polarized light fluxes to the following optical system. The superimposing lens 533 causes the illumination light fluxes having traveled through the polarization conversion member 534 to converge as a whole as appropriate and achieves superimposed illumination on the light modulators provided in the light modulating section 550 on a color basis. That is, the illumination light fluxes having traveled through the two fly-eye systems 531 and 532 and the superimposing lens 533 travel through the color separation system 540 and perform uniform superimposed illumination on the image formable regions of the light modulators for the three colors that form the light modulating section 550, that is, the liquid crystal panels 551b, 551r, and 551g for the three colors. The image formable regions are regions that are part of the regions of the liquid crystal panels 551b, 551r, and 551g and allow image formation.

The color separation system 540 includes first and second dichroic mirrors 541a, 541b, reflection mirrors 542a, 542b, and 542c, field lenses 543r and 543b, and first to third lenses 545a, 545b, 545c. The first dichroic mirror 541a, which receives red, green and, blue (R, G, B) three-color light fluxes, reflects blue light LB and transmits green light LG and red light LR. The second dichroic mirror 541b, which receives the green light LG and the red light LR incident thereon, reflects the red light LR and transmits the green light LG. In the color separation system 540, the illumination light having exited from the light source apparatus 520 and traveled through the homogenizing system 530 is first incident on the first dichroic mirror 541a. The blue light LB reflected off the first dichroic mirror 541a is guided along a first optical path OP1, travels via the reflection mirror 542a, and is then incident on the field lens 543b for adjusting the angle of incidence. The red light LR having passed through the first dichroic mirror 541a and having been reflected off the second dichroic mirror 541b is guided along a second optical path OP2 and incident on the field lens 543r. Further, the green light LG having passed through the second dichroic mirror 541b is guided along a third optical path OP3 and passes through the first to third lenses 545a, 545b, 545c via the reflection mirrors 542b and 542c. A relay system formed of the lenses 545a, 545b, and 545c is disposed in the green-light third optical path OP3, which has the longest optical path length of the lengths of the optical paths from the light source apparatus 520 to the liquid crystal panels 551r, 551g, and 551b for the three colors. The relay system transfers an image of the first lens 545a roughly as it is via the second lens 545b to the third lens 545c to prevent decrease in light use efficiency due, for example, to light divergence.

Among the lenses that form the relay system, the lens 545b, for example, can be displaced along the optical axis continuously or stepwise to arbitrarily change the size of an illumination area in the position of the liquid crystal panel 551g, that is, the illuminance of the green light LG on the image formable region of the liquid crystal panel 551g. That is, the illuminance of the blue light LB and the red light LR on the image formable regions of the liquid crystal panels 551b and 551r does not change but is fixed, whereas the illuminance of the green light LG on the image formable region of the liquid crystal panel 551g changes in accordance with the position of the lens 545b. Using the configuration described above allows optical adjustment of the white balance of the images that pass through the liquid crystal panels 551b, 551r, and 551g, are combined with one another, and are projected through the projection lens 400 on the screen.

The light modulating section 550 includes the three liquid crystal panels 551b, 551r, and 551g, on which the three-color illumination light fluxes LB, LR, and LG are incident, three sets of polarization filters 552b, 552r, and 552g, which are so disposed as to sandwich the liquid crystal panels 551b, 551r, and 551g, respectively, holders 590b, 590r, and 590g, which hold the liquid crystal panels 551b, 551r, and 551g, respectively, and the holder drivers 595b, 595r, and 595g, which move the liquid crystal panels 551b, 551r, and 551g held by the holders 590. For example, the liquid crystal panel 551b for the blue light LB and the pair of polarization filters 552b, which sandwich the liquid crystal panel 551b, form a liquid crystal light valve for performing two-dimensional luminance modulation on the illumination light. Similarly, the liquid crystal panel 551r for the red light LR and the corresponding pair of polarization filters 552r form a liquid crystal light valve, and the liquid crystal panel 551g for the green light LG and the corresponding pair of polarization filters 552g form a liquid crystal light valve.

In the light modulating section 550, the blue light LB guided along the first optical path OP1 is incident on the image formable region of the liquid crystal panel 551b via the field lens 543b. The red light LR guided along the second optical path OP2 is incident on the image formable region of the liquid crystal panel 551r via the field lens 543r. The green light LG guided along the third optical path OP3 is incident on the image formable region of the liquid crystal panel 551g via the relay system formed of the lenses 545a, 545b, and 545c. Each of the liquid crystal panels 551b, 551r, and 551g is a non-luminous, transmissive light modulator for changing the spatial distribution of the illumination light incident thereon, and the polarization state of the color light fluxes LB, LR, and LG incident on the liquid crystal panels 551b, 551r, and 551g are adjusted on a pixel basis in accordance with drive signals or image signals inputted in the form of electric signals to the liquid crystal panels 551b, 551r, and 551g. In this process, the polarization filters 552b, 552r, and 552g adjust the polarization directions of the illumination light fluxes incident on the liquid crystal panels 551b, 551r, and 551g and extract modulated light fluxes polarized in a predetermined direction from the light fluxes outputted from the liquid crystal panels 551b, 551r, and 551g.

The cross dichroic prism 560 is a light combining system and has the following dichroic films therein: a first dichroic film (specifically, dielectric multilayer film) 561, which is formed on a flat surface and reflects blue light, and a second dichroic film (specifically, dielectric multilayer film) 562, which is formed on a flat surface but slightly bent at the position of an intersection CL of the two dichroic films and reflects green light, with the dichroic films 561 and 562 disposed perpendicularly to each other as a whole. The cross dichroic prism 560 causes the blue light LB from the liquid crystal panel 551b to be reflected off the first dichroic film 561 and exit out of the cross dichroic prism 560 leftward when viewed along the direction in which the blue light LB has traveled, causes the red light LR from the liquid crystal panel 551r to travel straightforward via the two dichroic films 561 and 562 and exit out of the cross dichroic prism 560, and causes the green light LG from the liquid crystal panel 551g to be reflected off the second dichroic film 562 and exit out of the cross dichroic prism 560 rightward when viewed along the direction in which the green light LG has traveled. The image light fluxes thus combined with one another in the cross dichroic prism 560 travel through the projection lens 400, which is the projection system, and are projected at an appropriate magnification factor as a color image on the screen (not shown).

Detailed Configuration of Liquid Crystal Panel

The liquid crystal panel 551r will be described below in detail with reference to FIGS. 3A and 3B.

Figure 3B:
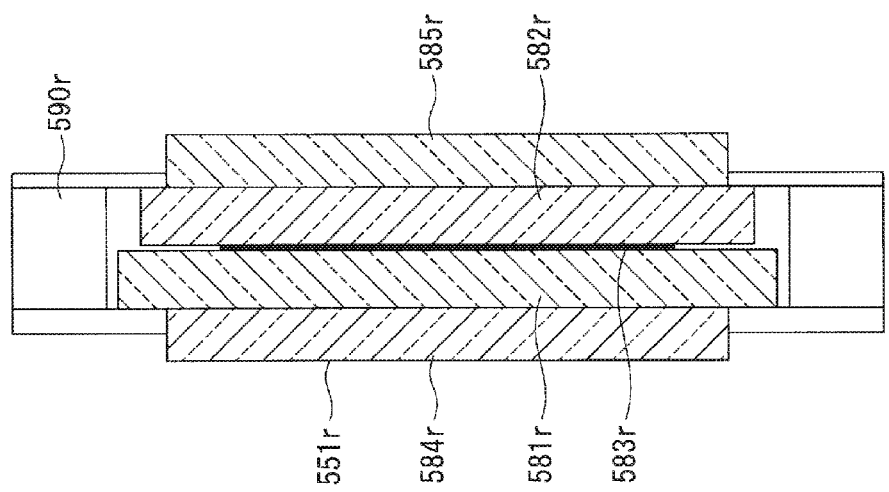
FIGS. 3A and 3B show an example of the configuration of a liquid crystal panel in the first embodiment.
Figure 3A:
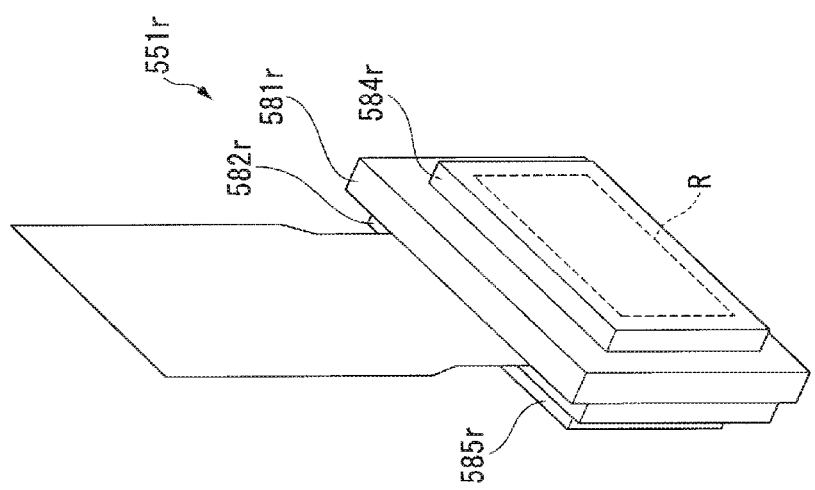

FIGS. 3A and 3B show an example of the configuration of the liquid crystal panel 551r in the first embodiment.

FIG. 3A is a perspective view of the liquid crystal panel 551r. FIG. 3B is a side view of the liquid crystal panel 551r.

The liquid crystal panel 551r includes a counter substrate 582r, which serves as a first substrate and on which a common electrode, a black mask, and other components are formed, a drive substrate 581r, which serves as a second substrate and on which data lines, scan lines, TFTs (thin film transistors) or other switching devices, pixel electrodes, and other components are formed, a liquid crystal material 583r, which serves as an electro-optical material sealed and encapsulated between the substrates 581r and 582r, a first dustproof glass plate 584r, which serves as a second light transmissive substrate, has an outer shape smaller than the drive substrate 581r in a plan view, and is provided on the drive substrate 581r, and a second dustproof glass plate 585r, which serves as a first light transmissive substrate, has an outer shape smaller than the counter substrate 582r in a plan view, and is provided on the counter substrate 582r.

The liquid crystal panel 551r further includes the holder 590r, which holds the liquid crystal panel 551r.

The above description has been made of the configuration of the liquid crystal panel 551 with reference to the liquid crystal panel 551r by way of example, and the liquid crystal panels 551b and 551g have the same configuration.

Detailed Configuration of Holder

The holder 590r will be described below in detail with reference to FIG. 4.

Figure 4:
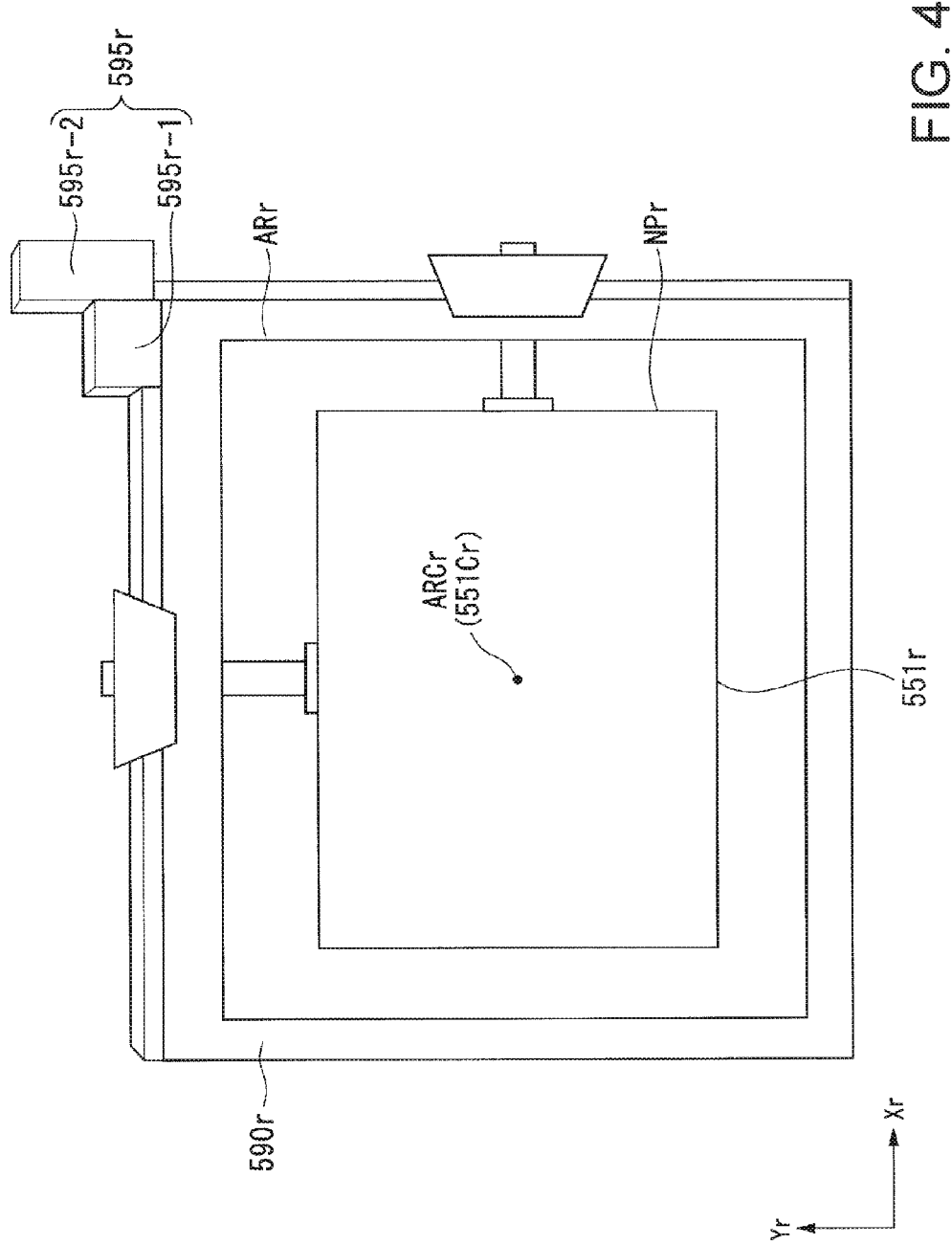
FIG. 4 shows an example of the configuration of a holder in the first embodiment.

FIG. 4 shows an example of the configuration of the holder 590r in the first embodiment.

The orthogonal coordinate system shown in FIG. 4 will now be described. The Xr axis is an axis in the lateral direction. Specifically, the Xr axis is an axis parallel to the liquid crystal panel 551r and further parallel to a flat plane perpendicular to all the three liquid crystal panels 551*r*, 551*g*, and 551*b*. The Yr axis is an axis in the longitudinal direction and parallel to all the three liquid crystal panels 551*r*, 551*g*, and 551*b*.

In the following description, the positive Yr-axis direction is also referred to as an upward direction. The negative Yr-axis direction is also referred to as a downward direction.

Further, in the following description, the positive Xr-axis direction is also referred to as a rightward direction. The negative Xr-axis direction is also referred to as a leftward direction.

The holder 590*r* is a frame that holds the liquid crystal panel 551*r*. The holder driver 595*r* is provided on the side surface of the holder 590*r*. The holder 590*r* is fixed to the projector 1. The holder driver 595*r* moves the position of the liquid crystal panel 551*r*, which is supported by the holder 590*r*, within a movable region ARr, which is a region inside the frame of the holder 590*r*. The holder driver 595*r* is driven in accordance with the control signal CT inputted from the controller 100 to move the position of the liquid crystal panel 551*r*, as described above.

The holder driver 595*r* is an ultrasonic linear actuator formed, for example, of a piezoelectric device, a drive shaft, a weight, and other components.

The holder driver 595*r* is formed of a holder lateral driver 595*r*-1 and a holder longitudinal driver 595*r*-2. The holder lateral driver 595*r*-1 moves the liquid crystal panel 551*r* in the lateral direction in accordance with the control signal CT. The holder longitudinal driver 595*r*-2 moves the liquid crystal panel 551*r* in the longitudinal direction in accordance with the control signal CT.

The holder driver 595*r* is an example of a light modulator moving section.

In the following description, the position of the liquid crystal panel 551*r* where a movable region center ARCr, which is the position of the center of the movable region ARr, coincides with a panel center 551Cr, which is the position of the center of the liquid crystal panel 551*r*, is referred to as a normal position NPr.

A description will be made of a case where the vibration acting on the projector 1 is lateral vibration. The controller 100 controls the holder lateral driver 595*r*-1 to cause it to move the holder driver 595*r* in the lateral direction in accordance with the vibration acting on the projector 1. Specifically, in a case where the direction information DR contained in the vibration information V acquired from the vibration detecting section 300 indicates the leftward direction, the controller 100 controls the holder lateral driver 595*r*-1 to cause it to move the liquid crystal panel 551*r* in the rightward direction. On the other hand, in a case where the direction information DR contained in the vibration information V acquired from the vibration detecting section 300 indicates the rightward direction, the controller 100 controls the holder lateral driver 595*r*-1 to cause it to move the liquid crystal panel 551*r* in the leftward direction.

The above description has been made of the configurations of the holder 590*r* and the holder driver 595*r* with reference to the liquid crystal panel 551*r*, and the holders and the holder drivers for the liquid crystal panels 551*b* and 551*g* also have the same configurations.

Combination of Modulated Light Fluxes from Liquid Crystal Panels 551*r*, 551*g*, and 551*b*

The position to which the liquid crystal panel 551 is moved will be described below with reference to FIG. 5.

Figure 5:
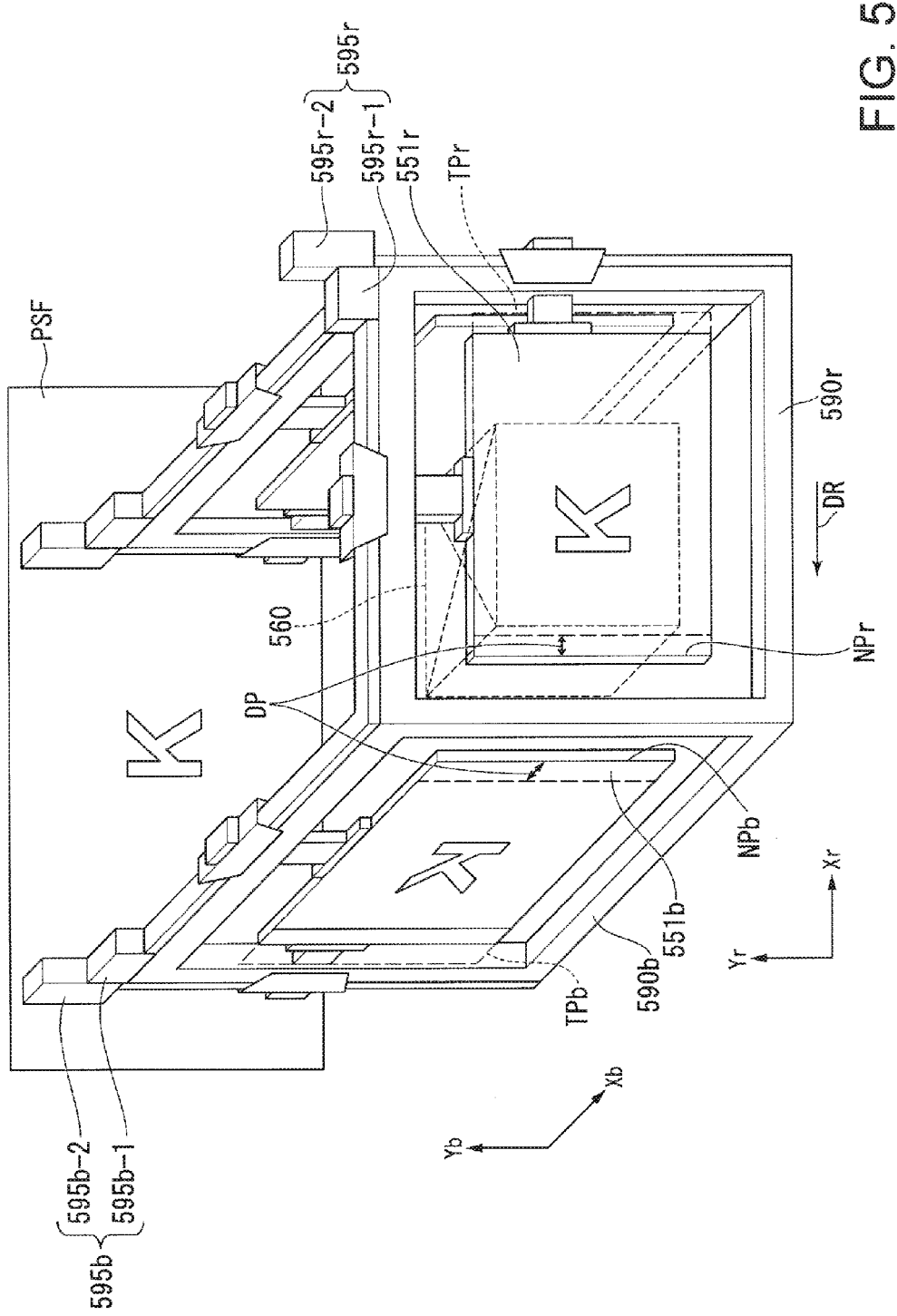
FIG. 5 is a first diagram showing an example of the position to which the liquid crystal panel is moved in the first embodiment.

FIG. 5 is a first diagram showing an example of the position to which the liquid crystal panel 551 is moved in the first embodiment.

In the present embodiment, the liquid crystal panel 551*r* is disposed in parallel to the flat plane containing the Xr axis and the Yr axis. Each of the liquid crystal panels 551*g* and 551*b* is so disposed as to be perpendicular (or roughly perpendicular) to the flat plane (Xr-Yr plane). Further, in the present embodiment, the liquid crystal panel 551*g* is disposed on the right of the liquid crystal panel 551*r*, and the liquid crystal panel 551*g* is disposed on the left of the liquid crystal panel 551*r*.

Moreover, in the present embodiment, the holder 590*g*, which supports the liquid crystal panel 551*g*, is so disposed as to be in contact with the right side of the holder 590*r*, which supports the liquid crystal panel 551*r*. Similarly, the holder 590*b*, which supports the liquid crystal panel 551*b*, is so disposed as to be in contact with the left side of the holder 590*r*, which supports the liquid crystal panel 551*r*.

The Xr axis, the Xg axis, and the Xb axis, which represent the lateral direction of the liquid crystal panels 551*r*, 551*g*, and 551*b*, respectively, are all parallel to the flat plane perpendicular to all the three liquid crystal panels 551*r*, 551*g*, and 551*b*.

The Yr axis, the Yg axis, and the Yb axis, which represent the longitudinal direction of the liquid crystal panels 551*r*, 551*g*, and 551*b*, respectively, are all parallel to the three liquid crystal panels 551*r*, 551*g*, and 551*b*.

The combination of the modulated light fluxes with one another in the cross dichroic prism 560 will now be described.

The blue light LB and the green light LG are reflected off the reflection mirrors 542*a*, 542*b*, and 542*c* and then incident on the liquid crystal panels 551*b* and 551*g*, respectively. The blue light LB and green light LG are incident on the liquid crystal panels 551*b* and 551*g* in such a way that the images formed in the liquid crystal panels 551*b* and 551*g* are reversed with respect to the image formed in the liquid crystal panel 551*r*, on which the red light LR is projected.

In the case where the liquid crystal panel 551*r* is moved in response to vibration, to project appropriately combined image light from the cross dichroic prism 560, the liquid crystal panels 551*b* and 551*g* need to move, in accordance with the movement of the liquid crystal panel 551*r*, in the direction opposite the direction in which the liquid crystal panel 551*r* moves.

In the case where the liquid crystal panel 551*r* is moved in response to vibration, the liquid crystal panel 551*r* is moved in the direction opposite the direction represented by the direction information DR contained in the vibration information V, as described above. The liquid crystal panel 551 (liquid crystal panel 551*b* or 551*g*) disposed on the side toward which the liquid crystal panel 551*r* is moved needs to be moved in the direction in which the liquid crystal panel 551 approaches the liquid crystal panel 551*r*. On the other hand, the liquid crystal panel 551 (liquid crystal panel 551*b* or 551*g*) disposed on the side opposite the side toward which the liquid crystal panel 551*r* is moved needs to be moved in the direction in which the liquid crystal panel 551 moves away from the liquid crystal panel 551*r*.

Example of Position to Which Liquid Crystal Panel is Moved: Liquid Crystal Panels 551*b*, 551*r*

The positions to which the liquid crystal panels 551*r* and 551*b* are moved will be described below with reference to FIG. 5 in a case where the direction information DR contained in the vibration information V indicates the leftward Xr-axis direction.

In this case, the liquid crystal panel 551*r* is moved by the holder lateral driver 595*r*-1 in the direction that allows the vibration to be canceled, as shown in FIG. 5. Specifically, the liquid crystal panel 551r is moved to a post-movement position TPr, which is the position of the liquid crystal panel 551r having moved from the normal position NPr in the rightward direction (+Xr direction) by the distance represented by the displacement information DP.

In response to the movement of the liquid crystal panel 551r to the post-movement position TPr, the liquid crystal panel 551b, which is disposed on the side opposite the side toward which the liquid crystal panel 551r is moved, is moved from the normal position NPb in the leftward direction (−Xb direction), which is the direction in which the liquid crystal panel 551b moves away from the liquid crystal panel 551r. The liquid crystal panel 551b is moved to a post-movement position TPb, which is the position of the liquid crystal panel 551b having moved from the normal position NPb in the leftward direction by the distance represented by the displacement information DP.

The above description has been made with reference to the case where the liquid crystal panel 551r is moved in the rightward direction (+Xr direction), but not necessarily. In a case where the liquid crystal panel 551r is moved in the leftward direction (−Xr direction), the liquid crystal panel 551b is moved in the rightward direction (+Xb direction).

Example of Position to Which Liquid Crystal Panel is Moved: Liquid Crystal Panels 551r, 551g The positions to which the liquid crystal panels 551r and 551g are moved will be described below with reference to FIG. 6 in a case where the direction information DR contained in the vibration information V indicates vibration in the leftward Xr-axis direction.

Figure 6:
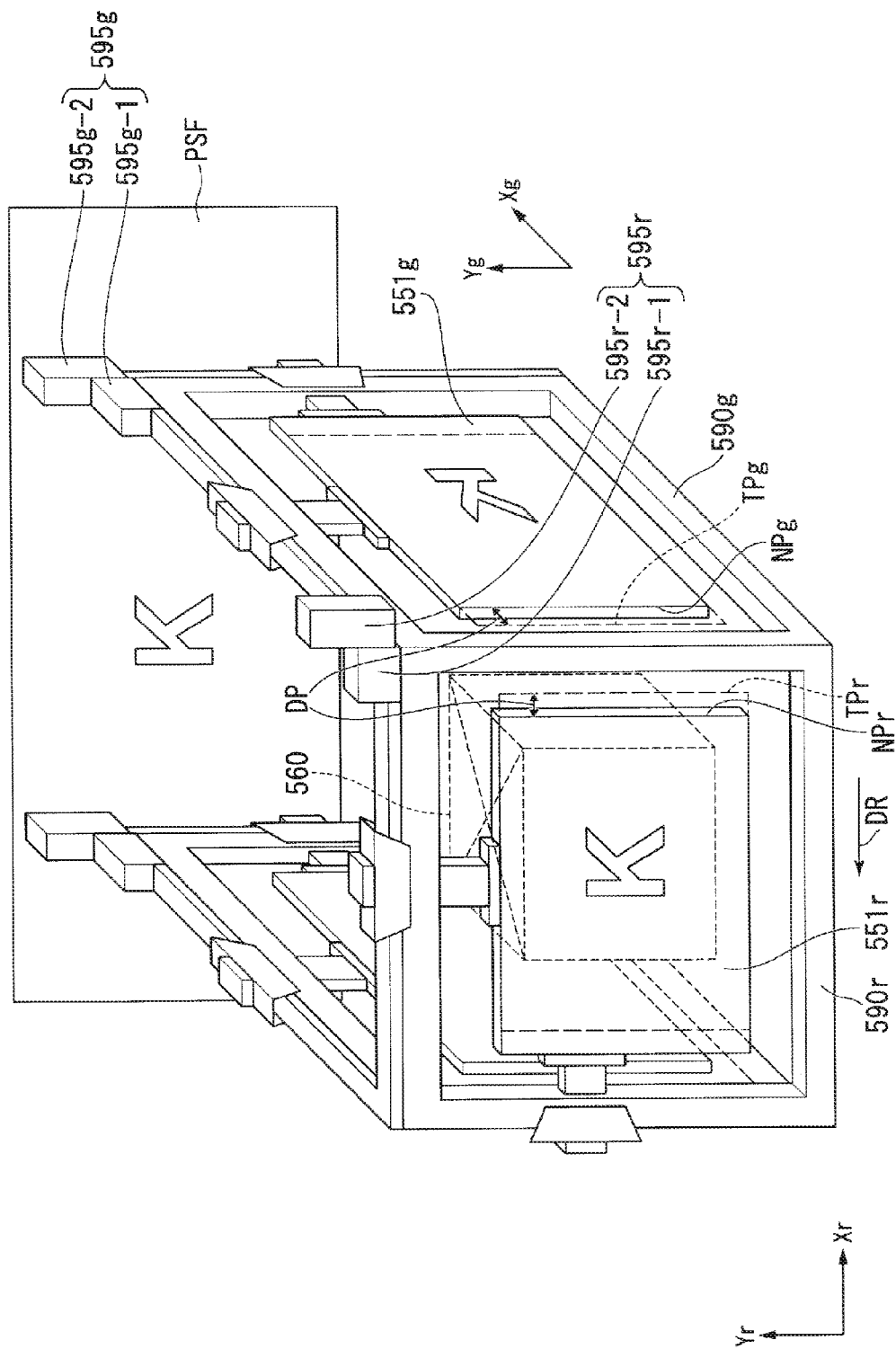
FIG. 6 is a second diagram showing the example of the position to which the liquid crystal panel is moved in the first embodiment.

FIG. 6 is a second diagram showing an example of the position to which the liquid crystal panel 551 is moved in the first embodiment.

In this case, the liquid crystal panel 551r is moved by the holder lateral driver 595r-1 to the post-movement position TPr in accordance with the vibration, as described above.

In response to the movement of the liquid crystal panel 551r to the post-movement position TPr, the liquid crystal panel 551g, which is disposed on the side toward which the liquid crystal panel 551r is moved, is moved to the direction in which the liquid crystal panel 551g approaches the liquid crystal panel 551r. The liquid crystal panel 551g is moved from the normal position NPg in the leftward direction (−Xg direction), which is the direction in which the liquid crystal panel 551g approaches the liquid crystal panel 551r. The liquid crystal panel 551g is moved to a post-movement position TPg, which is the position of the liquid crystal panel 551g having moved from the normal position NPb in the leftward direction by the distance represented by the displacement information DP.

The above description has been made with reference to the case where the liquid crystal panel 551r is moved in the rightward direction (+Xr direction), but not necessarily. In a case where the liquid crystal panel 551r is moved in the leftward direction (−Xr direction), the liquid crystal panel 551g is moved in the rightward direction (+Xg direction).

In the configuration described above, the image light projected from the liquid crystal panel 551 located in the positions controlled by the holder controlling section 120 is projected on a projection surface PSF via the projection lens 400. An image projected on the projection surface PSF from the liquid crystal panel 551 located in the positions controlled by the holder controlling section 120 is an image moved from an original projection position on the basis of the vibration information V.

An image projected on the projection surface PSF from the liquid crystal panels 551r, 551b, and 551g located in the positions controlled by the holder controlling section 120 is an image projected in a corrected position where the vibration acting on the projector 1 is canceled.

Action of Projector

The action of the projector 1 will be described below with reference to FIG. 7.

Figure 7:
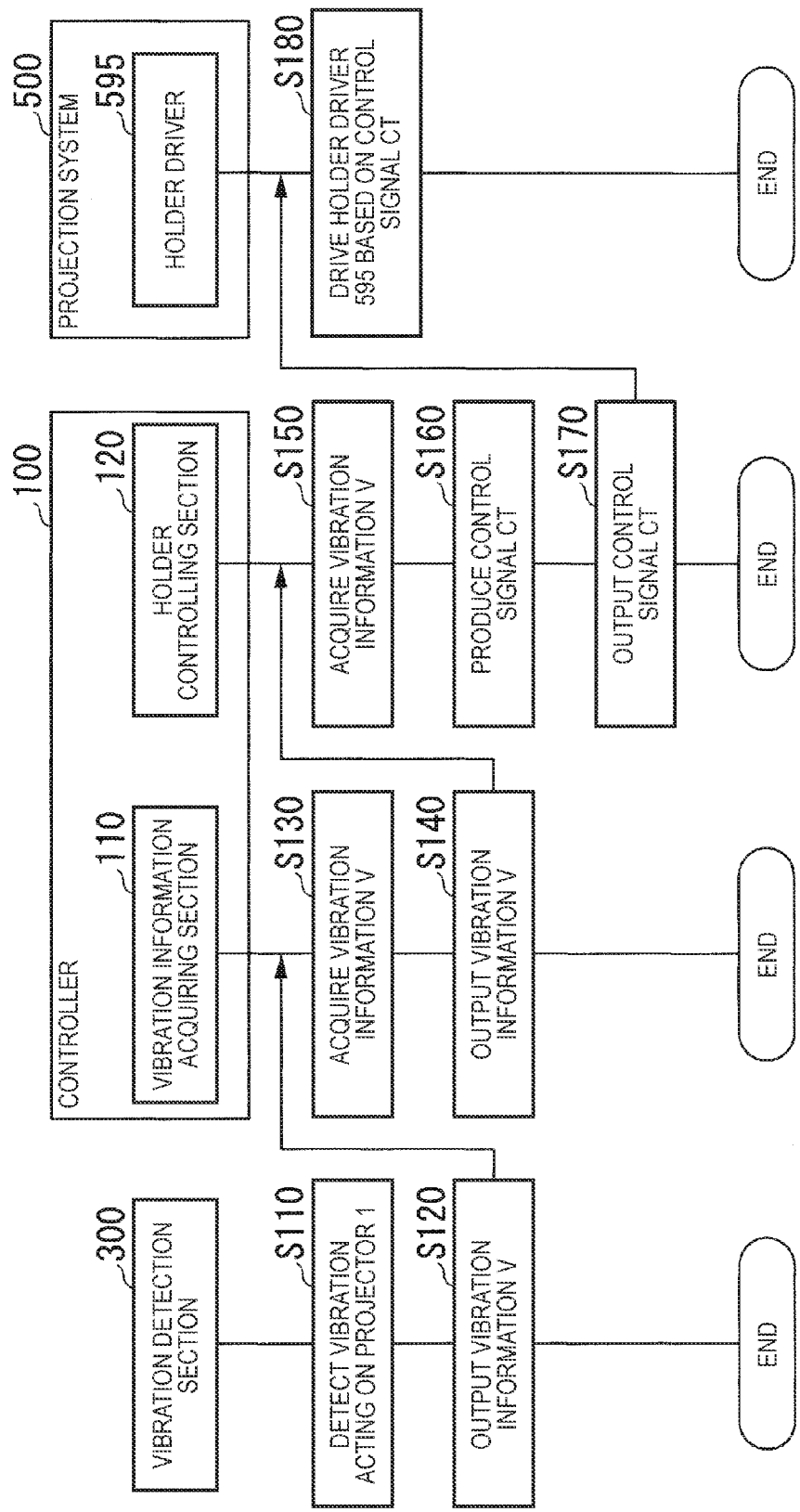
FIG. 7 is a flowchart showing an example of the action of the projector according to the first embodiment.

FIG. 7 is a flowchart showing an example of the action of the projector 1 according to the first embodiment.

The vibration detection section 300 detects vibration acting on the projector 1 (step S110). The vibration detection section 300 outputs detected vibration information V to the controller 100 (step S120).

The vibration information acquiring section 110 provided in the controller 100 acquires the vibration information V from the vibration detection section 300 (step S130). The vibration information acquiring section 110 outputs the acquired vibration information V to the holder controlling section 120 (step S140).

The holder controlling section 120 acquires the vibration information V (step S150). The holder controlling section 120 produces the control signal CT, which controls the holder driver 595, on the basis of the acquired vibration information V (step S160). The holder controlling section 120 outputs the produced control signal CT to the projection system 500 (step S170).

The holder driver 595 provided in the projection system 500 is driven on the basis of the control signal CT outputted from the holder controlling section 120 (step S180).

Brief of First Embodiment

As described above, a projector according to the present embodiment (projector 1 in an example of the first embodiment) is a projector that projects image light on a projection surface (projection surface PSF in an example of the first embodiment) and includes a light modulator (liquid crystal panel 551 in an example of the first embodiment) that modulates light emitted from a light source on the basis of image information (image information PI in an example of the first embodiment) to form the image light, a projection system (projection system 500 in an example of the first embodiment) that projects the image light modulated with the light modulator on the projection surface, a light modulator moving section (holder driver 595 in an example of the first embodiment) that changes the position of the light modulator, a vibration detecting section (vibration detecting section 300 in an example of the first embodiment) that detects vibration acting on the projector, and a controller (holder controlling section 120 in an example of the first embodiment) that causes the light modulator moving section to change the position of the light modulator.

The projector 1 according to the present embodiment can correct the position of an image projected on the projection surface PSF in accordance with the vibration acting on the projector 1. Specifically, the projector 1 according to the present embodiment can project an image in a position where the vibration acting on the projector 1 is canceled.

As a result, an image that is readily viewed by a viewer who views an image projected by the projector 1 can be provided.

The projector 1 according to the present embodiment includes the holder driver 595. The holder driver 595 can move the liquid crystal panel 551 in the lateral direction in accordance with the control signal CT outputted by the holder controlling section 120 provided in the controller 100. The projector 1 according to the present embodiment can correct the position of an image projected on the projection surface PSF in accordance with the vibration acting on the projector 1.

The projector 1 according to the present embodiment can therefore correct the position of an image projected on the projection surface PSF in accordance with lateral shake out of the vibration acting on the projector 1.

As a result, an image that is readily viewed by a viewer who views an image projected by the projector 1 can be provided.

The above description has been made with reference to the case where the vibration acting on the projector 1 is lateral vibration, but not necessarily. The vibration acting on the projector 1 may be longitudinal vibration. In this case, the holder controlling section 120 may output the control signal CT that controls the holder longitudinal driver 595r-2, a holder longitudinal driver 595g-2, and a holder longitudinal driver 595b-2 in accordance with the vibration information V to move the liquid crystal panels 551r, 551g, and 551b. In the case where the vibration acting on the projector 1 is longitudinal vibration, the liquid crystal panels 551r, 551g, and 551b are moved in the same direction in accordance with the vibration information V.

The above description has been made with reference to the case where the central liquid crystal panel 551r out of the three liquid crystal panels 551b, 551r, and 551g directly faces the projection surface, but not necessarily. For example, the image light through the projection lens 400 may be reflected off a reflection mirror so that the image light is projected in a direction other than the frontward direction. Even in this case, a blur of an image due to vibration in the direction parallel to the projection surface can be corrected by movement of the liquid crystal panels 551b, 551r, and 551g.

The above description has been made with reference to the case where the direction in which the liquid crystal panel 551 is moved in accordance with the vibration information V is the direction opposite the direction represented by the direction information DR contained in the vibration information V, but not necessarily. The direction in which the liquid crystal panel 551 is moved may be any direction that allows the vibration acting on the projector 1 to be canceled. For example, the direction in which the liquid crystal panel 551 is moved may be a direction inclining with respect to the direction opposite the direction represented by the direction information DR.

The above description has been made with reference to the case where the distance over which the liquid crystal panel 551 is moved is the distance represented by the displacement information DP contained in the vibration information V, but not necessarily. The distance over which the liquid crystal panel 551 is moved may be any distance that allows the vibration acting on the projector 1 to be canceled. For example, the distance that allows correction of a blur of an image projected on the projection surface PSF when the liquid crystal panel 551 is moved over the distance differs in some cases from the distance represented by the displacement information DP contained in the vibration information V representing the vibration acting on the projector 1. In this case, the distance over which the liquid crystal panel 551 is moved may be a distance that allows correction of a blur of an image projected on the projection surface PSF when the liquid crystal panel 551 is moved over the distance.

Second Embodiment: Configuration in which Image Displayed in Liquid Crystal Panel is Moved The configuration of a projector 2 according to a second embodiment will be described below with reference to the drawings.

Figure 8:
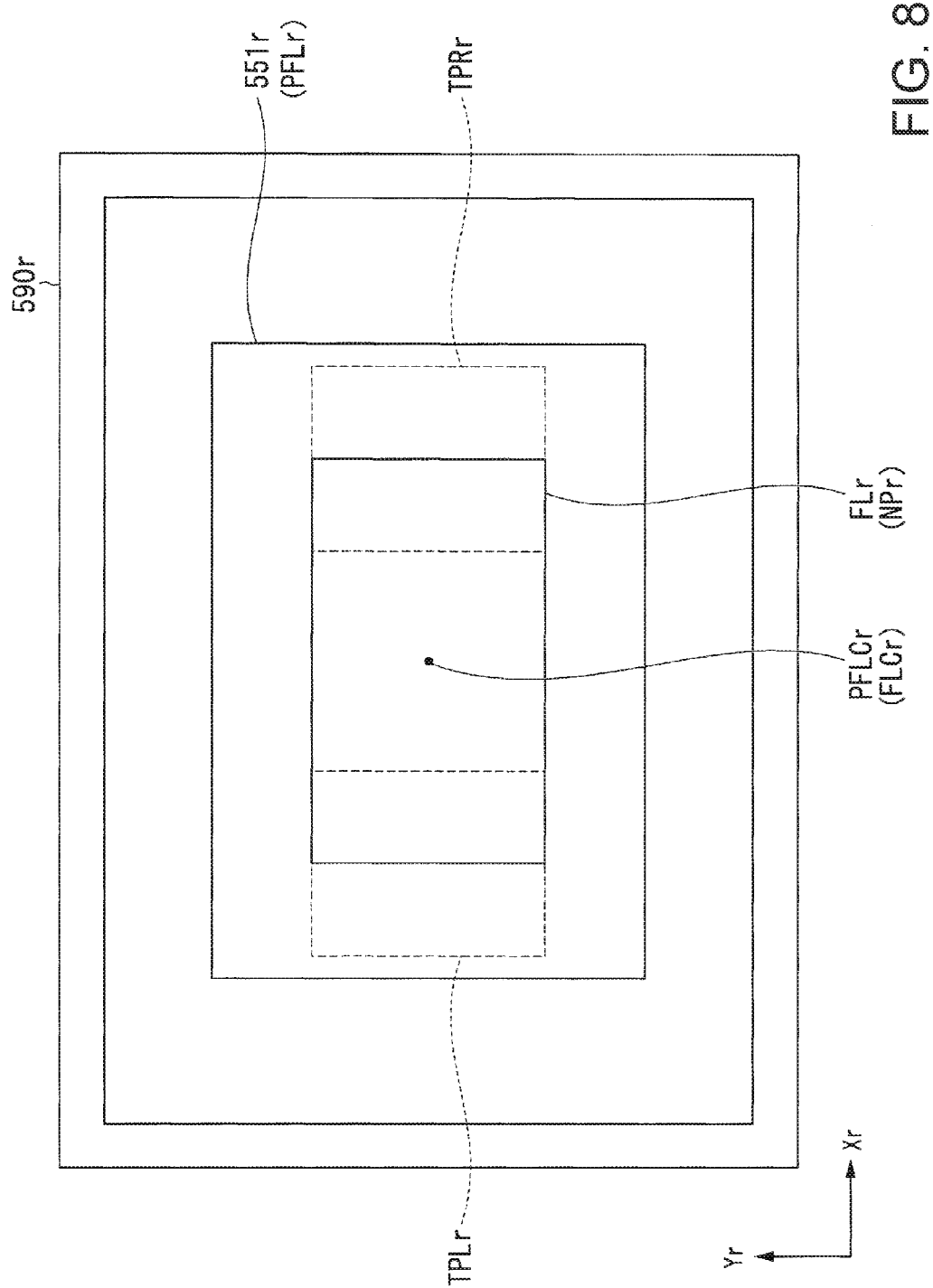
FIG. 8 shows an example of an image formation region of a liquid crystal panel in a second embodiment.

FIG. 8 shows an example of an image formation region FL of the liquid crystal panel 551 in the second embodiment.

The orthogonal coordinate system shown in FIG. 8 is the same as the orthogonal coordinate system shown in FIG. 4.

The first embodiment has been described with reference to the configuration in which the holder driver 595 moves the liquid crystal panel 551 in accordance with the vibration information V.

The second embodiment differs from the first embodiment in that the liquid crystal panel 551 is moved and the position of an image formed in the liquid crystal panel 551 is changed in accordance with the magnitude of vibration detected by the vibration detecting section 300.

The image formable region PFLr is a region where the liquid crystal panel 551r can form an image, as described above. An image formation region FLr is a region which is part of the image formable region PFLr of the liquid crystal panel 551r and where an image is formed.

In the projector 2 according to the present embodiment, the position of the image formable region PFLr is moved in accordance with vibration acting on the projector 2. Specifically, the position of the image formation region FLr, which is part of the image formable region PFLr, is moved in accordance with the vibration acting on the projector 2 in some cases.

In the following description, the center of the image formable region PFLr is referred to as an image formable region center PFLCr. Further, in the following description, the center of the image formation region FLr is referred to as an image formation region center FLCr. Moreover, in the following description, the position of the image formation region FLr where the image formable region center PFLCr coincides with the image formation region center FLCr is referred to as the normal position NPr.

Further, in the following description, the position of the image formation region FLr in a case where the image formation region FLr is located at the right end of the image formable region PFLr is referred to as a post-movement right position TPRr. Similarly, in the following description, the position of the image formation region FLr in a case where the image formation region FLr is located at the left end of the image formable region PFLr is referred to as a post-movement left position TPLr.

In the above description, the configurations of the image formable region PFLr and the image formation region FLr have been described with reference to the liquid crystal panel 551r by way of example, and the image formable regions and the image formation regions of the liquid crystal panels 551b and 551g have the same configurations.

Configuration of Projector

The configuration of the projector 2 according to the present embodiment will be described below with reference to FIG. 9.

Figure 9:
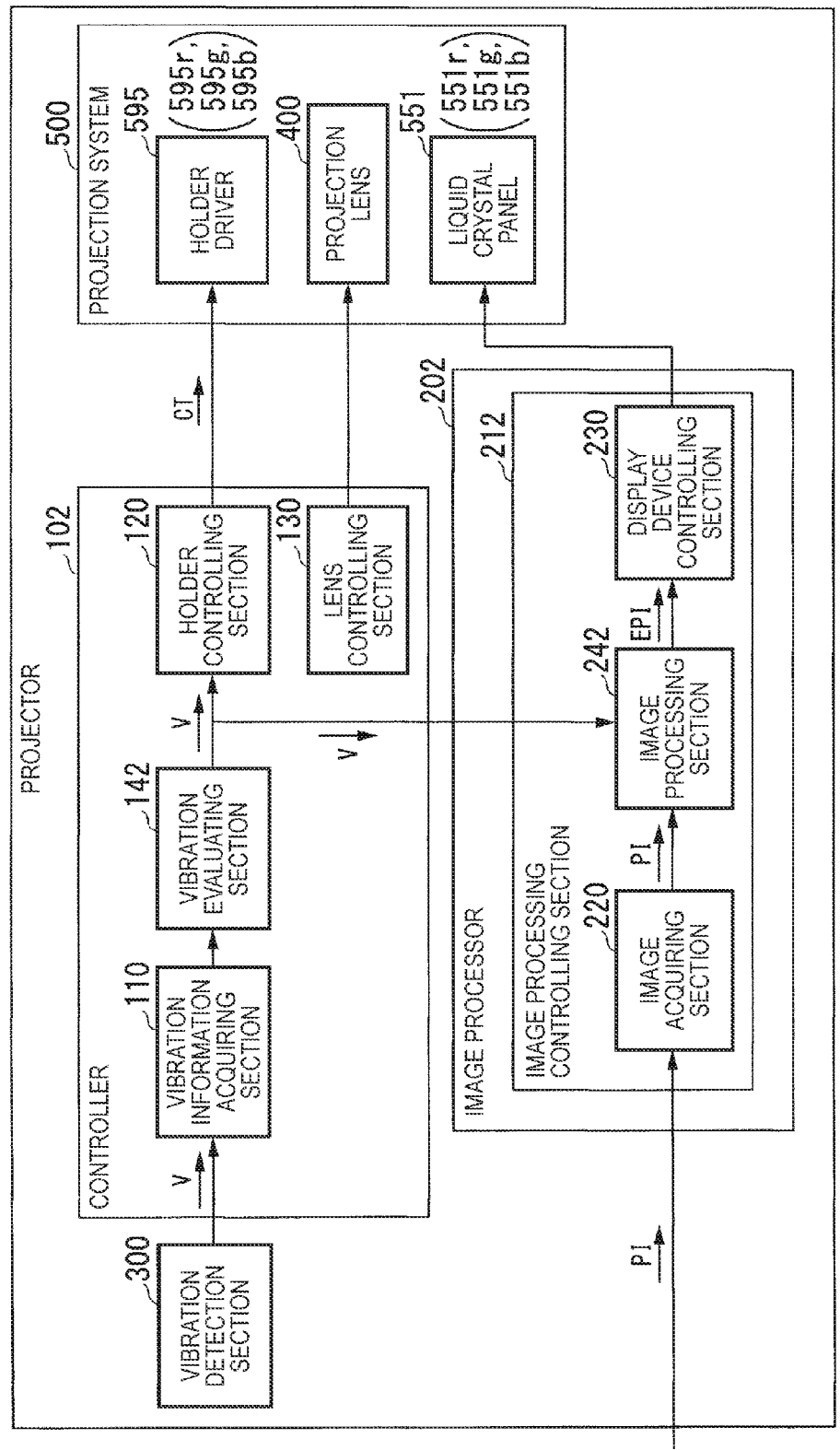
FIG. 9 shows an example of the configuration of a projector according to the second embodiment.

FIG. 9 shows an example of the configuration of the projector 2 according to the second embodiment.

The projector 2 includes the vibration detecting section 300, a controller 102, an image processor 202, and the projection system 500, as shown in FIG. 9.

The same configurations and actions as those in the first embodiment described above have the same reference characters and will not be described.

Detailed Configuration of Controller

The controller 102 includes a CPU and includes, as functional sections of the CPU, the vibration information acquiring section 110, a vibration evaluating section 142, the holder controlling section 120, and the lens controlling section 130.

The vibration information acquiring section 110 acquires the vibration information V from the vibration detection section 300. The vibration information acquiring section 110 outputs the acquired vibration information V to the vibration evaluating section 142.

The vibration evaluating section 142 determines the magnitude of the vibration represented by the vibration information V acquired from the vibration information acquiring section 110. The vibration evaluating section 142, when it determines that the vibration represented by the vibration information V is greater than or equal to a threshold, outputs the vibration information V to the holder controlling section 120. On the other hand, the vibration evaluating section 142, when it determines that the vibration represented by the vibration information V is smaller than the threshold, outputs the vibration information V to the image processor 202.

The threshold is a threshold of the distance represented by the displacement information DP contained in the vibration information V. Specifically, the threshold is a distance based on which the image formation regions FLr, FLg and FLb can be determined to be moved in the image formable regions PFLr, PFLg, and PFLb. In the following description, in a case where the image formable regions PFLr, PFLg, and PFLb are not distinguished from one another, they are referred to as an image formable region PFL. Further, in a case where the image formation regions FLr, FLg and FLb are not distinguished from one another, they are referred to as an image formation region FL.

Specifically, in a case where the distance represented by the displacement information DP contained in the vibration information V is longer than the distance represented by the threshold, the vibration evaluating section 142 outputs the vibration information V to the holder controlling section 120. On the other hand, in a case where the distance represented by the displacement information DP contained in the vibration information V is shorter than the distance represented by the threshold, the vibration evaluating section 142 outputs the vibration information V to the image processor 202.

The action taken by the holder controlling section 120 when it acquires the vibration information V is the same as the action taken by the holder controlling section 120 in the first embodiment described above and will therefore not be described.

Detailed Configuration of Image Processor

The image processor 202 includes an image processing controlling section 212. The image processing controlling section 212 includes a CPU and includes, as functional sections of the CPU, the image acquiring section 220, an image processing section 242, and the display device controlling section 230.

When the vibration evaluating section 142 determines that the distance represented by the displacement information DP contained in the vibration information V is shorter than the distance represented by the threshold, the image processing section 242 acquires the vibration information V from the vibration evaluating section 142. The image processing section 242 further acquires the image information PI, which represents an image projected by the projector 2, from the image acquiring section 220.

The image processing section 242 performs image processing in which the position of an image formed in the liquid crystal panel 551 is moved in accordance with the vibration information V acquired from the vibration evaluating section 142. Specifically, the image processing section 242 performs image processing in which the position of the image formation region FL where an image is formed is moved in the direction that allows the vibration acting on the projector 2 to be canceled. The image processing section 242 produces image processing information EPI, which is information representing that an image is formed in the position of the moved image formation region FL. The image processing section 242 outputs the produced image processing information EPI to the display device controlling section 230.

The display device controlling section 230 controls the liquid crystal panel 551 on the basis of the image processing information EPI outputted from the image processing section 242. Images formed in the liquid crystal panels 551r, 551b, and 551g on the basis of the image processing information EPI, which represents that the image formation region FL has been controlled, under the control of the display device controlling section 230 are images formed in the corrected positions where the vibration acting on the projector 2 is canceled.

Brief of Second Embodiment

As described above, a projector according to the present embodiment (projector 2 in an example of the second embodiment) includes an image processing section (image processing section 242 in an example of the second embodiment) that adjusts image information (image information PI in an example of the second embodiment) to be outputted to a light modulator (liquid crystal panel 551 in an example of the second embodiment), and in a case where vibration detected by a vibration detecting section (vibration detecting section 300 in an example of the second embodiment) is smaller than a threshold, a controller (controller 102 in an example of the second embodiment) causes the image processing section to adjust the image information, whereas in a case where the vibration is greater than or equal to the threshold, the controller causes a light modulator moving section (holder driver 595 in an example of the second embodiment) to change the position of the light modulator.

The projector 2 according to the present embodiment can therefore correct a blur of an image projected on the projection surface PSF in accordance with the magnitude of the vibration acting on the projector 2. The projector 2 according to the present embodiment can correct the image information PI to be projected in the case where the magnitude of the vibration acting on the projector is smaller than the threshold, whereas the projector 2 can correct the position of the liquid crystal panel 551 in the case where the magnitude of the vibration is greater than or equal to the threshold.

For example, comparison between the period required for the image processing section 242 to perform the image processing on the image information PI and the period required to move the position of the liquid crystal panel 551 under the control of the holder controlling section 120 shows in some cases that the former is shorter than the latter.

Therefore, the projector 2 according to the present embodiment can project an image indicated by the image processing information EPI, which represents the position of the image formation region FL controlled by the image processing section 242, on the projection surface PSF to quickly correct a blur of the image in the case where the vibration represented by the vibration information V is smaller than the threshold.

The above description has been made with reference to the case where the holder driver 595 moves the liquid crystal panel 551 in the case where the magnitude of the vibration based on the vibration information V detected by the vibration detecting section 300 is greater than the threshold, but not necessarily.

As another example, in the case where the magnitude of the vibration based on the vibration information V detected by the vibration detecting section 300 (magnitude according to displacement information DP) is greater than the threshold, the holder driver 595 may move the liquid crystal panel 551, and the image processing section 242 may perform image processing on the image information PI. In this case, the image processing section 242 performs image processing in which the image formation region FL is moved. In this process, the magnitude of the total movement that is the combination of the movement performed by the holder driver 595 and the movement performed by the image processing section 242 is preferably equal to (or roughly equal to) the magnitude of the vibration based on the vibration information V. As an example, the image processing section 242 may perform image processing in which the image formation region FL is moved to the post-movement right position TPR or the post-movement left position TPL, and the holder controlling section 120 may move the liquid crystal panel 551 by the distance represented by the displacement information DP from which the distance over which the image formation region FL is moved in the image processing is subtracted.

In a projector according to the present embodiment (projector 2 in an example of the second embodiment), in the case where the vibration detected by a vibration detecting section (vibration detecting section 300 in an example of the second embodiment) is greater than or equal to a threshold, a controller (controller 2 in an example of the second embodiment) causes an image processing section (image processing section 242 in an example of the second embodiment) to adjust image information (image information PI in an example of the second embodiment) and further causes a light modulator moving section (holder driver 595 in an example of the second embodiment) to change the position of the light modulator.

The projector 2 according to the present embodiment can therefore handle large vibration acting on the projector 2 and correct a blur of an image projected on the projection surface PSF.

The following projector controlling method may be carried out. The projector controlling method is a method for controlling a projector including a light modulator that modulates light emitted from a light source on the basis of image information to form image light and a projection system that projects the image light modulated by the light modulator on a projection surface, and the method includes a vibration detection step of detecting vibration acting on the projector and a control step of changing the position of the light modulator on the basis of the vibration detected in the vibration detection step.

In a case where vibration having magnitude greater than the movable range of the liquid crystal panel 551 acts on the projector 1 and the projector 2 according to the embodiments described above, correction (lens shift correction) in which the projection lens 400 is moved in the direction perpendicular to the optical axis to shift the image projection position may be used.

For example, in the case where vibration having magnitude greater than the movable range of the liquid crystal panel 551 acts on the projector, the lens control section 130 may perform the lens shift correction on the projection lens 400 on the basis of the vibration information V.

In each of the embodiments described above, the projector 1 and the projector 2 including the three liquid crystal panels 551r, 551g, and 551b are presented by way of example. Instead, a projector based on DLP (Digital Light Processing: registered trademark of Texas Instruments Incorporated, USA) using a reflective light modulating device called a DMD (Digital Micromirror Device: registered trademark of Texas Instruments Incorporated, USA) may be used.

The projector 1 and the projector 2 have been described with reference to the case where they include the three liquid crystal panels 551r, 551g, and 551b, which are transmissive light modulators, but not necessarily. Each of the projector 1 and the projector 2 may include reflective light modulators.

Each portion provided in the projector 1 and the projector 2 according to the embodiments described above may be achieved by dedicated hardware or may be achieved by a memory and a microprocessor.

Each portion provided in the projector 1 and the projector 2 may be formed of a memory and a CPU (central processing unit), and the function of the portion provided in the projector 1 and the projector 2 may be achieved by loading a program for achieving the function into the memory and executing the program.

A program for achieving the function of each portion provided in the projector 1 and the projector 2 may be recorded on a computer readable recording medium, the program recorded on the recording medium may be read by a computer system, and the read program may be executed to carry out a variety of processes. The "computer system" used herein is assumed to include an OS and hardware, such as a peripheral apparatus.

The "computer system" is assumed to include a website providing environment (or website displaying environment) in a case where the computer system uses the WWW system.

The "computer readable recording medium" refers to a portable medium, such as a flexible disk, a magneto-optical disk, a ROM, and a CD-ROM, and a storage device, such as a hard disk drive built in the computer system. Further, the "computer readable recording medium" is assumed to encompass a component that dynamically holds a program for a short period, such as a communication line in a case where a program is transmitted over the Internet or any other network or a telephone circuit or any other communication circuit and a component that holds a program for a fixed period, such as a volatile memory in a computer system that works as a server or a client in the case described above. The program described above may instead be a program that achieves part of the function described above or a program that achieves the function described above when combined with a program having already been stored in the computer system.

The embodiments of the invention have been described in detail with reference to the drawings, but the specific configurations are not limited to those in the embodiments, and a change can be made thereto as appropriate to the extent that the change does not depart from the substance of the invention. The configurations described in the above embodiments may also be combined with each other.

What is claimed is:

1. A projector that projects image light on a projection surface, the projector comprising:
   a light modulator that modulates light emitted from a light source based on image information to form the image light;
   a projection system that projects the image light modulated by the light modulator on the projection surface;
   a light modulator moving section that changes a position of the light modulator;
   a vibration detecting section that detects vibration acting on the projector;
   a controller that causes the light modulator moving section to change the position of the light modulator based on the vibration detected by the vibration detecting section; and
   a light modulator holder which includes the light modulator moving section, the light modulator moving section being configured to move the light modulator laterally and longitudinally within an inner frame region of the light modulator holder.

2. The projector according to claim 1, further comprising an image processing section that adjusts the image information to be outputted to the light modulator,
   wherein in a case where the vibration detected by the vibration detecting section is smaller than a threshold, the controller causes the image processing section to adjust the image information,
   whereas in a case where the vibration is greater than or equal to the threshold, the controller causes the light modulator moving section to change the position of the light modulator.

3. The projector according to claim 2 wherein
   in the case where the vibration detected by the vibration detecting section is greater than or equal to the threshold, the controller causes the image processing section to adjust the image information and further causes the light modulator moving section to change the position of the light modulator.

4. A method for controlling a projector including a light modulator that modulates light emitted from a light source based on image information to form image light and a projection system that projects the image light modulated by the light modulator on a projection surface, the method comprising:
   a vibration detection step of detecting vibration acting on the projector; and
   a control step of changing a position of the light modulator, using a light modulator moving section, based on the vibration detected in the vibration detection step, wherein the projector has a light modulator holder which includes the light modulator moving section, the light modulator moving section being configured to move the light modulator laterally and longitudinally within an inner frame region of the light modulator holder in the control step.

5. The projector according to claim 1, wherein
   the light modulator moving section includes a lateral driver configured to move the light modulator laterally and a longitudinal driver configured to independently move the light modulator longitudinally.

6. The method according to claim 4, wherein
   the light modulator moving section includes a lateral driver configured to move the light modulator laterally in the control step and a longitudinal driver configured to independently move the light modulator longitudinally in the control step.

7. The projector according to claim 1, wherein
   the light modulator includes a plurality of light modulators, the light modulator holder includes a plurality of light modulator holders, and the light modulator moving section includes a plurality of light modulator moving sections, and
   each of the light modulators is held within a respective one of the light modulator holders, and each of the light modulator moving sections is provided to a respective one of the light modulator holders to change a position of the light modulator held within the respective one of the light modulator holders.

8. The method according to claim 4, wherein
   the light modulator includes a plurality of light modulators, the light modulator holder includes a plurality of light modulator holders, and the light modulator moving section includes a plurality of light modulator moving sections, and
   each of the light modulators is held within a respective one of the light modulator holders, and each of the light modulator moving sections is provided to a respective one of the light modulator holders to change a position of the light modulator held within the respective one of the light modulator holders in the control step.

* * * * *